(12) United States Patent
Davila

(10) Patent No.: US 6,219,926 B1
(45) Date of Patent: Apr. 24, 2001

(54) RULER FOR MEASURING AND MARKING LENGTHS AND ANGLES RELATIVE TO A HORIZONTAL PLANE UTILIZING GRAVITY

(76) Inventor: Xavier Davila, 206 Neptune La. 09S120, Bronx, NY (US) 10473

( * ) Notice: Subject to any disclaimer, the term of this patent is extended or adjusted under 35 U.S.C. 154(b) by 0 days.

(21) Appl. No.: 09/085,579

(22) Filed: May 28, 1998

(51) Int. Cl.⁷ .................................................. G01C 9/12
(52) U.S. Cl. .............................................. 33/391; 33/365
(58) Field of Search ........................... 33/391, 483, 1 AP, 33/485, 493, 498, 474, 395, 398, 399, 451, 333, 334, 348, 349, 350, 351, 352, 353, 354, 355, 365, 397

(56) References Cited

U.S. PATENT DOCUMENTS

| | | | |
|---|---|---|---|
| 438,518 | * 10/1890 | Blackwood et al. | 33/391 |
| 460,388 | * 9/1891 | Downey | 33/391 |
| 567,832 | * 9/1896 | Johns | 33/391 |
| 821,371 | * 5/1906 | McDonald | 33/391 |
| 898,853 | * 9/1908 | Durst | 33/391 |
| 919,860 | * 4/1909 | Hastings | 33/391 |
| 937,631 | * 10/1909 | McMahal | 33/391 |
| 1,440,275 | * 12/1922 | Cerveny | 33/398 |
| 4,188,729 | * 2/1980 | Peterson | 33/391 |
| 4,204,334 | * 5/1980 | Dela Cruz | 33/391 |
| 4,212,123 | * 7/1980 | Robin | 33/391 |
| 4,267,642 | 5/1981 | Stapleford | 33/473 |
| 4,715,127 | 12/1987 | Bernabeu | 33/494 |
| 4,999,922 | * 3/1991 | Loggins | 33/474 |
| 5,383,276 | 1/1995 | Izumi | 33/1 AP |

FOREIGN PATENT DOCUMENTS

14103 * of 1898 (GB) .................................... 33/391

* cited by examiner

Primary Examiner—Diego Gutierrez
Assistant Examiner—Maria Fernandez
(74) Attorney, Agent, or Firm—Richard L. Miller

(57) ABSTRACT

A ruler for measuring and marking lengths and angles, relative to a horizontal plane by utilizing gravity. The ruler includes a substrate for being oriented relative to a horizontal plane and for measuring and marking lengths, and angle measuring assembly associated with the substrate for measuring and marking angles. The angle measuring assembly has a pointer whose lowermost end is heavier than its uppermost end, which allows the pointer to always remain vertical, regardless what angle the substrate is oriented relative to the horizontal plane, with the tangle the substrate is oriented relative to the horizontal plane being the angle to be measured and being that angular increment of a scale of the angle measuring assembly that the pointer points too.

18 Claims, 2 Drawing Sheets

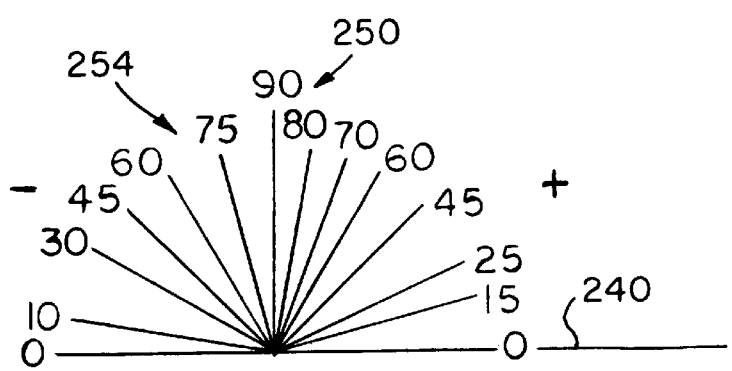
FIG. 11
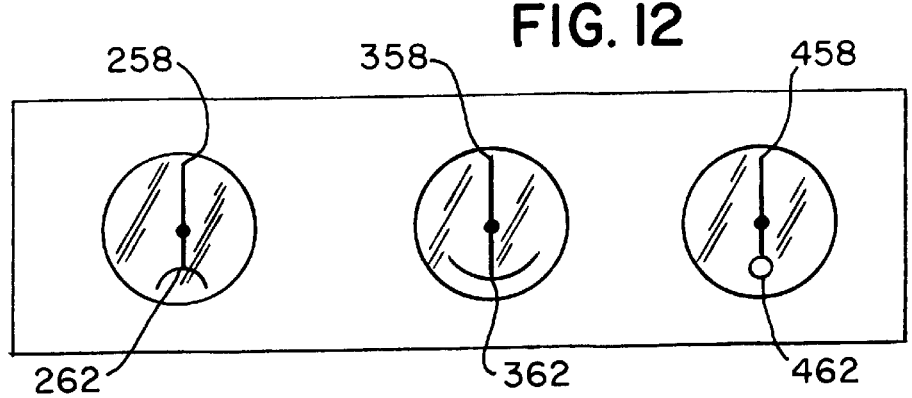
FIG. 12
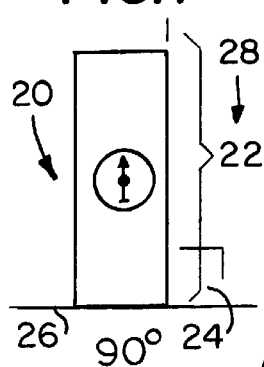
FIG. 1
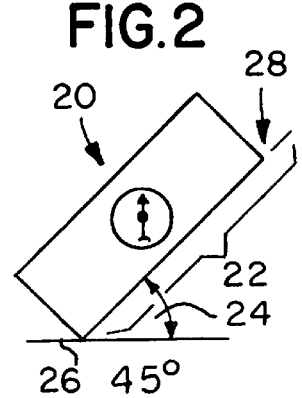
FIG. 2
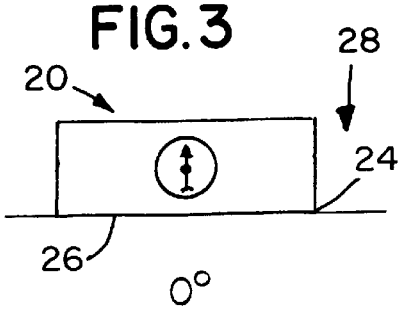
FIG. 3
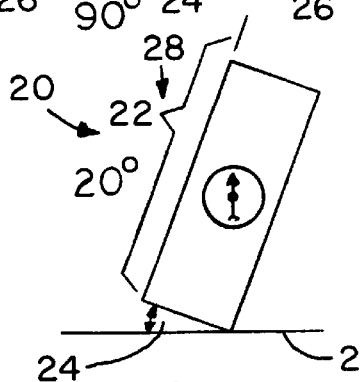
FIG. 4
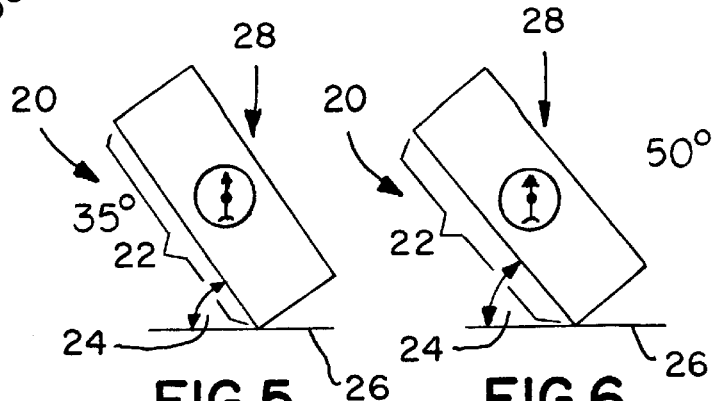
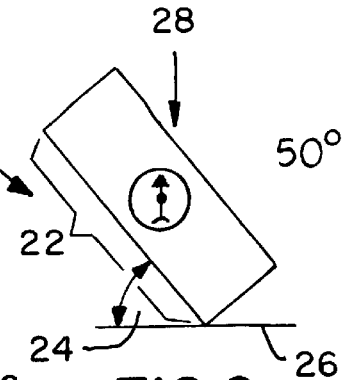
FIG. 5   FIG. 6

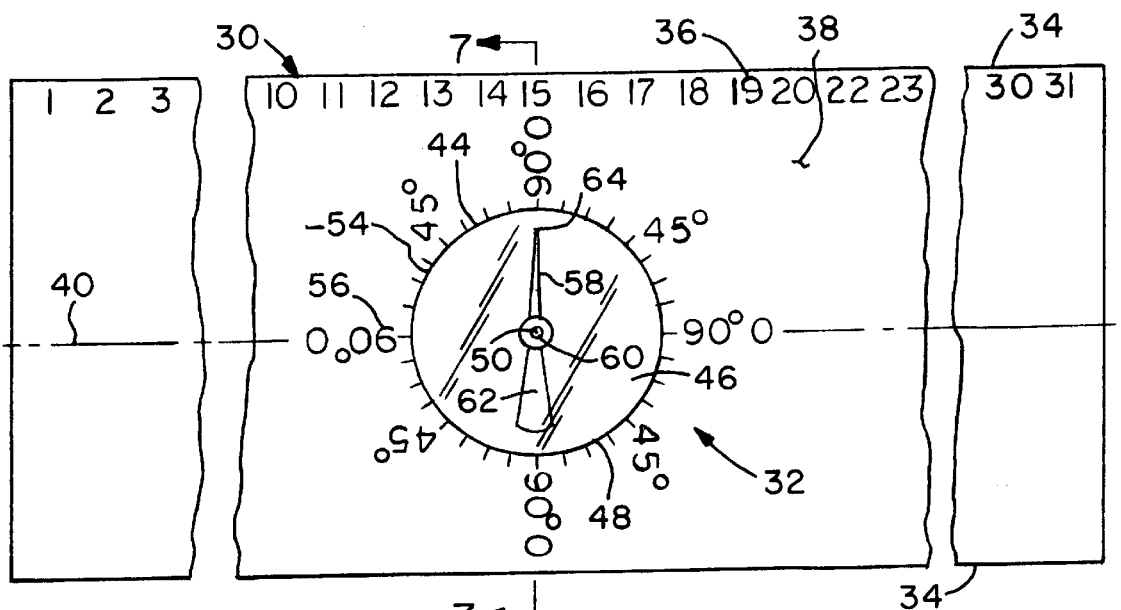
FIG. 7
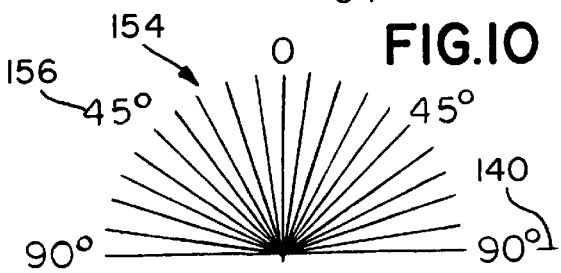
FIG. 10
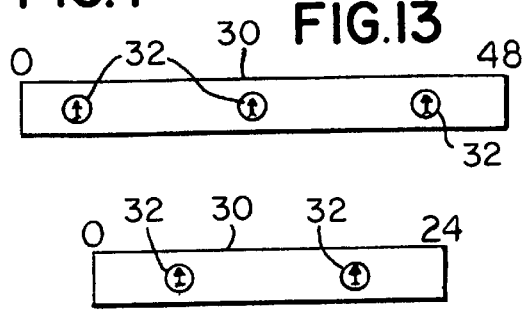
FIG. 13
FIG. 14
FIG. 15 FIG. 16
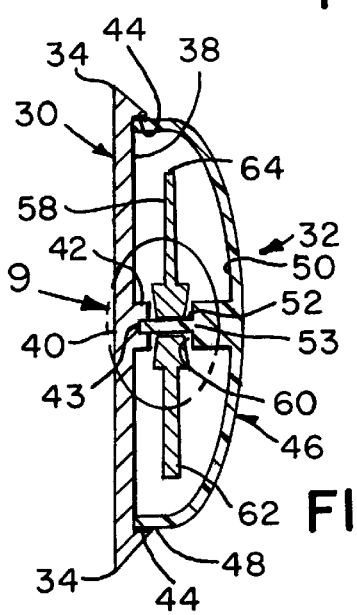
FIG. 8
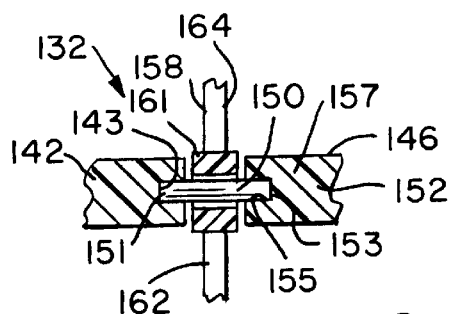
FIG. 9

000
RULER FOR MEASURING AND MARKING LENGTHS AND ANGLES RELATIVE TO A HORIZONTAL PLANE UTILIZING GRAVITY

BACKGROUND OF THE INVENTION

1. Field of the Invention

The present invention relates to a ruler. More particularly, the present invention relates to a ruler for measuring and marking lengths and angles relative to a horizontal plane by utilizing gravity.

2. Description of the Prior Art

Numerous innovations for measuring devices have been provided in the prior art that will be described. Even though these innovations may be suitable for the specific individual purposes to which they address, however, they differ from the present invention.

FOR EXAMPLE, U.S. Pat. No. 4,267,642 to Stapleford teaches an angle gage mechanism for use in measuring angles of surfaces in a work piece usually requiring more than one conventional tool at the present time. This invention is capable of performing the most used functions of at least five conventional tools, to wit, solid square, bevel protractor, combination square, rule and bevel. It also includes a vernier for added accuracy and a plurality of pre-set angles that can be readily selected by the user.

The invention comprises a frame with a cylindrical hole housing a cylindrical spindle having means for readily locking the spindle at predetermined angles with respect to the frame and means for frictionally locking the spindle at any angle with respect to the frame. A slot in the frame aligned with a partial slot in the spindle receive a slidable ruler. The frame is further provided with means for frictionally locking the ruler relative to the spindle.

ANOTHER EXAMPLE, U.S. Pat. No. 4,715,127 to Bernabeu teaches a device for measuring angles between an oriented axis and a vector that is provided in the form of a flat plate of transparent material having at least two straight parallel edges and an arrow situated on the plate and parallel with the edges; the plate has a number of zones marked on the surface thereof and a closed curve centrally located and a longitudinal line provided parallel to the edges on either side of the central zone. Markings are provided in the zones to facilitate the measurement of the angles without requiring removal of the plate from the surface on which the angles are being measured.

FINALLY, STILL ANOTHER EXAMPLE, U.S. Pat. No. 5,383,276 to Izumi teaches an angle trisecting device with a base section having two angle indicating scales and an elongated member with a straight edge portion. The elongated member is pivotally mounted on the base section. A given angle on one angle indicating scale coinciding with the straight edge portion corresponds to a trisected angle on the other angle indicating scale coinciding with the straight edge portion. Pivot pins extend from the elongated member and are removably captured in respective base slots to ensure reliable operation. In another embodiment a guide wall extends from the base to ensure reliable operation. An optional link arm is pivotally mounted to the base section and with one end pivotally mounted to the elongated member.

It is apparent that numerous innovations for measuring devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a ruler for measuring and marking lengths and angles relative to a horizontal plane by utilizing gravity that avoids the disadvantages of the prior art.

ANOTHER OBJECT of the present invention is to provide a ruler for measuring and marking lengths and angles relative to a horizontal plane by utilizing gravity that is simple and inexpensive to manufacture.

STILL ANOTHER OBJECT of the present invention is to provide a ruler for measuring and marking lengths and angles relative to a horizontal plane by utilizing gravity that is simple to use.

BRIEFLY STATED, YET ANOTHER OBJECT of the present invention is to provide a ruler for measuring and marking lengths and angles relative to a horizontal plane by utilizing gravity. The ruler includes a substrate for being oriented relative to a horizontal plane and for measuring and marking lengths, and angle measuring assembly associated with the substrate for measuring and marking angles. The angle measuring assembly has a pointer whose lowermost end is heavier than its uppermost end, which allows the pointer to always remain vertical, regardless what angle the substrate is oriented relative to the horizontal plane, with the angle the substrate is oriented relative to the horizontal plane being the angle to be measured and being that angular increment of a scale of the angle measuring assembly that the pointer points too.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic front elevational view of the present invention measuring a 90 degree angle relative to a horizontal plane by utilizing gravity;

FIG. 2 is a diagrammatic front elevational view of the present invention measuring a 45 degree angle relative to a horizontal plane by utilizing gravity;

FIG. 3 is a diagrammatic front elevational view of the present invention measuring a 0 degree angle relative to a horizontal plane by utilizing gravity;

FIG. 4 is a diagrammatic front elevational view of the present invention measuring a 20 degree angle relative to a horizontal plane by utilizing gravity;

FIG. 5 is a diagrammatic front elevational view of the present invention measuring a 35 degree angle relative to a horizontal plane by utilizing gravity;

FIG. 6 is a diagrammatic front elevational view of the present invention measuring a 50 degree angle relative to a horizontal plane by utilizing gravity;

FIG. 7 is an enlarged diagrammatic front elevational view of the present invention shown in FIGS. 1–6;

FIG. 8 is an enlarged diagrammatic cross sectional view taken on line 8—8 in FIG. 7;

FIG. 9 is an enlarged diagrammatic cross sectional view of an alternate embodiment of the area generally enclosed by the dotted ellipse identified by arrow 9 in FIG. 8;

FIG. 10 is a diagrammatic front elevational view of a second embodiment of the angle scale of the angle measuring assembly;

FIG. 11 is a diagrammatic front elevational view of a third embodiment of the angle scale of the angle measuring assembly;

FIG. 12 is a diagrammatic front elevational view of a second, a third, and a fourth embodiment of the pointer of the of the angle measuring assembly;

FIG. 13 is a diagrammatic front elevational view of a 48" long version of the present invention having three angle measuring assemblies;

FIG. 14 is a diagrammatic front elevational view of a 24" long version of the present invention having two angle measuring assemblies;

FIG. 15 is a diagrammatic front elevational view of a 12" long version of the present invention having one angle measuring assembly; and FIG. 16 is a diagrammatic front elevational view of a 6" long version of the present invention having one angle measuring assembly.

LIST OF REFERENCE NUMERALS UTILIZED IN THE DRAWING

First Embodiment of Substrate and Angle Measuring Assembly 20 ruler for measuring and marking lengths and angles relative to a horizontal plane by utilizing gravity of the present invention
22 lengths
24 angles
26 horizontal plane
28 gravity
30 substrate for being oriented relative to horizontal plane and measuring and marking lengths 22
32 angle measuring assembly for measuring and marking angles 24
34 pair of parallel edges of substrate 30
36 incremental length markings extending along at least one edge of pair of parallel edges 34 of substrate 30
38 front surface of substrate 30
40 longitudinal axis of substrate 30
42 boss at least one point along longitudinal axis 40 of substrate 30 on front surface 38 of substrate 30
43 bore in boss 42 of substrate 30
44 circumferential shoulder extending concentrically and completely around boss 42 on front surface 38 of substrate 30
46 cap of angle measuring assembly 32
48 circumferential perimeter of cap 46 of angle measuring assembly 32
50 concave surface of cap 46 of angle measuring assembly 32
52 post of cap 46 of angle measuring assembly 32
53 center of concave surface 50 of cap 46 of angle measuring assembly 32
54 scale of angle measuring assembly 32
56 angular increments of scale 54 of angle measuring assembly 32
58 pointer of angle measuring assembly 32
60 center of pointer 58 of angle measuring assembly 32
62 lowermost end of pointer 58 of angle measuring assembly 32
64 uppermost end of pointer 58 of angle measuring assembly 32

Second Embodiment of Cap, Post, and Pointer of the Angle Measuring Assembly 132 angle measuring assembly
150 post
151 one end of post 150
143 bore in boss 142 of substrate
142 boss of substrate
146 cap of angle measuring assembly 132
153 other end of post 150
155 bore in boss 157 at center 159 of concave surface of cap 146 of angle measuring assembly 132 157 boss at center 159 of concave surface of cap 146 of angle measuring assembly 132
159 center of concave surface of cap 146 of angle measuring assembly 132
161 bushing of pointer 158 of angle measuring assembly 132
162 lower half of pointer 158 of angle measuring assembly 132
164 upper half of pointer 158 of angle measuring assembly 132

Second Embodiment of Scale of Angle Measuring Assembly 140 longitudinal axis of substrate
154 scale of angle measuring assembly
156 increments of scale 154 of angle measuring assembly Third Embodiment of Scale of Angle Measuring Assembly 240 longitudinal axis of substrate
254 scale of angle measuring assembly
256 increments of scale 254 of angle measuring assembly Third Embodiment of Pointer of Angle Measuring Assembly 258 pointer of angle measuring assembly
262 lowermost end of pointer 258 of angle measuring assembly Fourth Embodiment of Pointer of Angle Measuring Assembly 358 pointer of angle measuring assembly
362 lowermost end of pointer 358 of angle measuring assembly Fifth Embodiment of Pointer of Angle Measuring Assembly 458 pointer of angle measuring assembly
462 lowermost end of pointer 458 of angle measuring assembly

DETAILED DESCRIPTION OF THE PREFERRED EMBODIMENT

Referring now to the figures, in which like numerals indicate like parts, and particularly to FIGS. 1–6, respectively, the ruler for measuring and marking lengths and angles relative to a horizontal plane by utilizing gravity of the present invention is shown generally at 20 for measuring and marking lengths 22 and angles 24 relative to a horizontal plane 26 by utilizing gravity 28.

The overall configuration of the ruler for measuring and marking lengths and angles relative to a horizontal plane by utilizing gravity 20 can best be seen in FIG. 7, and as such will be discussed with reference thereto.

The ruler for measuring and marking lengths and angles, relative to a horizontal plane by utilizing gravity 20 comprises a substrate 30 for being oriented relative to the horizontal plane 26 and measuring and marking the lengths 22, and an angle measuring assembly 32 associated with the substrate 30 for measuring and marking the angles 24.

The specific configuration of the substrate 30 can best be seen in FIG. 7, and as such will be discussed with reference thereto.

The substrate 30 is generally rectangular-shaped, elongated, thin, and flat with a pair of parallel edges 34 that are beveled for easy marking of measurements read from incremental length markings 36 that extends along at least one edge of the pair of parallel edges 34 of the substrate 30, on its front surface 38.

The specific configuration of the angle measuring assembly 32 can best be seen in FIGS. 7 and 8, and as such will be discussed with reference thereto.

The angle measuring assembly 32 comprises the front surface 38 of the substrate 30 having at least one point along its longitudinal axis 40, a boss 42 with a bore 43 axially therein.

The angle measuring assembly 32 further comprises the front surface 38 of the substrate 30 having a circumferential shoulder 44 that extends concentrically and completely around the boss 42 on the front surface 38 of the substrate 30.

The angle measuring assembly 32 further comprises a cap 46 that is transparent and detachably engages in the circumferential shoulder 44 of the front surface 38 of the substrate 30 and in the bore 43 in the boss 42 on the front surface 38 of the substrate 30.

The cap 46 of the angle measuring assembly 32 is cup-shaped with a circumferential perimeter 48 that detachably engages in the circumferential shoulder 44 on the front surface 38 of the substrate 30, with its concave surface 50 facing the front surface 38 of the substrate.

The cap 46 of the angle measuring assembly 32 further has a post 52 that extends integrally and axially from the concave surface 50 of the cap 46 of the angle measuring assembly 32, at its center 53, to and detachably engages in the bore 43 in the boss 42 on the front surface 38 of the substrate 30, which together with the circumferential perimeter 48 detachably engaging in the circumferential shoulder 44 on the front surface 38 of the substrate 30 allows the cap 46 of the angle measuring assembly 32 to be detached from the substrate 30.

The post 52 of the cap 46 is preferably plastic which forms a natural bearing surface.

The angle measuring assembly 32 further comprises a scale 54 that comprises its angular increments 56 inscribed completely around the circumferential shoulder 44 on the front surface 38 of the substrate 30, with the longitudinal axis 40 of the substrate 30 and its orthogonal axis being 0 and 90 degree increments, with smaller increments therebetween.

The angle measuring assembly 32 further comprises a pointer 58 that rotatively receives, at its center 60, the post 50 of the cap 46 of the angle measuring assembly 32, and is preferably plastic.

The pointer 58 of the angle measuring assembly 32 has a lowermost end 62 that is sector-shaped and upwardly-tapering, and heavier than its uppermost end 64, which allows the pointer 58 of the angle measuring assembly 32 to always remain vertical, regardless what angle the substrate 30 is oriented relative to the horizontal plane 26, with the angle the substrate 30 is oriented relative to the horizontal plane 26, being the angle to be measured, being that angular increment of the angular increments 56 of the scale 54 of the angle measuring assembly that the uppermost end 64 of the pointer 58 of the angle measuring assembly points too.

An second embodiment of the cap 146, post 150, and pointer 158 of the angle measuring assembly 132 can best be seen in FIG. 9, and as such will be discussed with reference thereto.

The post 150 is preferably metal and has one end 151 detachably received in the bore 143 in the boss 142 of the substrate, and its other end 153 detachably received in a bore 155 in a boss 157, at the center 159 of the concave surface of the cap 146 of the angle measuring assembly 132.

The pointer 158 of the angle measuring assembly 132 comprises a bushing 161 that is a fluorocarbon polymer with slippery and non-sticking properties, typically sold under the tradename TEFLON™.

The bushing 161 of the pointer 158 of the angle measuring assembly 132 rotatively receives the post 150 of the angle measuring assembly 132 for rotation relative thereto.

The pointer 158 of the angle measuring assembly 132 further comprises an upper half 164 and a lower half 162 that are one of plastic and metal, and which are pressed into the bushing 161 of the pointer 158 of the angle measuring assembly 132 for rotation therewith.

A second embodiment of the scale 154 of the angle measuring assembly 32 can best be seen in FIG. 10, and as such will be discussed with reference thereto.

The scale 154 of the angle measuring assembly 32 has its increments 156 inscribed radially outwardly from one side of the longitudinal axis 140 of the substrate, with the longitudinal axis 140 of the substrate being 90 degrees and its orthogonal axis being 0 degrees, with smaller increments therebetween.

A third embodiment of the scale 254 of the angle measuring assembly 32 can best be seen in FIG. 11, and as such will be discussed with reference thereto.

The scale 254 of the angle measuring assembly 32 has its increments 256 inscribed radially outwardly from one side of the longitudinal axis 240 of the substrate, with the longitudinal axis 240 of the substrate being 0 degrees and its orthogonal axis being 90 degrees, with smaller increments therebetween, and with one side of the orthogonal axis being minus and the other side being positive.

A third embodiment of the pointer 258, a fourth embodiment of the pointer 358, and a fifth embodiment of the pointer 458 can best be seen in FIG. 12, and as such will be discussed with reference thereto.

The pointer 258 has it lowermost end 262 being convexo-concave-shaped, the pointer 358 has it lowermost end 362 being concavo-convex-shaped, and the pointer 458 has it lowermost end 462 being circular-shaped.

As shown in FIG. 13, the substrate 30 can be 48" long and have three angle measuring assemblies 32 spaced longitudinally therealong.

As shown in FIG. 14, the substrate 30 can be 24" long and have two angle measuring assemblies 32 spaced longitudinally therealong.

As shown in FIG. 15, the substrate 30 can be 12" long and have one angle measuring assembly thereon.

As shown in FIG. 16, the substrate 30 can be 6" long and have one angle measuring assembly thereon.

It will be understood that each of the elements described above, or two or more together, may also find a useful application in other types of constructions differing from the types described above.

While the invention has been illustrated and described as embodied in a ruler for measuring and marking lengths and angles relative to a horizontal plane by utilizing gravity, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A ruler for measuring and marking lengths and angles relative to a horizontal plane by utilizing gravity, said ruler comprising:
   a) a substrate for being oriented relative to a horizontal plane and for measuring and marking lengths; said substrate being generally rectangular-shaped, elongated, thin, and flat with a pair of parallel edges being beveled for easy marking of measurements read from incremental length markings extending along at least one edge of said pair of parallel edges of said substrate, on its front surface; and
   b) an angle measuring assembly associated with said substrate for measuring and marking angles; said angle measuring assembly comprising:
      i) said front surface of said substrate having a longitudinal axis and at least one point along said longitudinal axis thereof, a boss with a bore axially therein;
      ii) said front surface of said substrate having a circumferential shoulder extending concentrically and completely around said boss on said front surface of said substrate; and
      iii) a cap being transparent and detachably engaging in said circumferential shoulder on said front surface of said substrate and in said bore in said boss on said front surface of said substrate; said cap of said angle measuring assembly being cup-shaped with a circumferential perimeter detachably engaging in said circumferential shoulder on said front surface of said substrate, with its concave surface facing said front surface of said substrate; said cap of said angle measuring assembly further having a post extending axially from said concave surface of said cap of said angle measuring assembly, at its center, to detachably engaging in, said bore and in said boss on said front surface of said substrate, which together with said circumferential perimeter detachably engaging in said circumferential shoulder on said front surface of said substrate allowing said cap of said angle measuring assemble to be detached from said substrate; said post of said cap of said angle measuring assembly being integral with said concave surface of said cap of said angle measuring assembly and being plastic which forms a natural bearing surface.

2. The ruler as defined in claim 1, wherein said angle measuring assembly further comprises a scale whose angular increments are inscribed on said front surface of said substrate.

3. The ruler as defined in claim 2, wherein said angular increments of said scale of said angle measuring assembly are inscribed completely around said circumferential shoulder, with said longitudinal axis of said substrate and its orthogonal axis being 0 and 90 degree increments, with smaller increments therebetween.

4. The ruler as defined in claim 2, wherein said angular increments of said scale of said angle measuring assembly are inscribed radially outwardly from one side of said longitudinal axis of said substrate, with said longitudinal axis of said substrate being 90 degrees and its orthogonal axis being 0 degrees, with smaller increments therebetween.

5. The ruler as defined in claim 2, wherein said angular increments of said scale of said angle measuring assembly are inscribed radially outwardly from one side of said longitudinal axis of said substrate, with said longitudinal axis of said substrate being 0 degrees and its orthogonal axis being 90 degrees, with smaller increments therebetween, and with one side of said orthogonal axis being minus and the other side being positive.

6. The ruler as defined in claim 1, wherein said angle measuring assembly further comprises a pointer that rotatively receives, at its center, said post of said cap of said angle measuring assembly.

7. The ruler as defined in claim 6, wherein said pointer of said angle measuring assembly has a lowermost end that is heavier than its uppermost end, which allows said pointer of said angle measuring assembly to always remain vertical, regardless what angle said substrate is oriented relative to the horizontal plane, with said angle said substrate is oriented relative to the horizontal plane being the angle to be measured and being that angular increment of said angular increments of said scale of said angle measuring assembly that said uppermost end of said pointer of said angle measuring assembly points to.

8. The ruler as defined in claim 7, wherein said pointer of said angle measuring assembly is plastic and its lowermost end is sector-shaped and upwardly-tapering.

9. The ruler as defined in claim 7, wherein said pointer of said angle measuring assembly comprises a bushing that is a fluorocarbon polymer with slippery and non-sticking properties.

10. The ruler as defined in claim 9, wherein said bushing of said pointer of said angle measuring assembly rotatably receives said post of said angle measuring assembly for rotation relative thereto.

11. The ruler as defined in claim 9, wherein said pointer of said angle measuring assembly further comprises an upper half and a lower half that are one of plastic and metal, and which are pressed into said bushing of said pointer of said angle measuring assembly for rotation therewith.

12. The ruler as defined in claim 7, wherein said lowermost end of said pointer of said angle measuring assembly is convexo-concave-shaped.

13. The ruler as defined in claim 7, wherein said lowermost end of said pointer of said angle measuring assembly is concavo-convex-shaped.

14. The ruler as defined in claim 7, wherein said lowermost end of said pointer of said angle measuring assembly is circular-shaped.

15. The ruler as defined in claim 1, wherein said substrate is 48" long and has three angle measuring assemblies spaced longitudinally therealong.

16. The ruler as defined in claim 1, wherein said substrate is 24" long and has two angle measuring assemblies spaced longitudinally therealong.

17. The ruler as defined in claim 1, wherein said substrate is 12" long and has one angle measuring assembly thereon.

18. The ruler as defined in claim 1, wherein said substrate is 6" long and has one angle measuring assembly thereon.

* * * * *